(12) United States Patent
Fuke et al.

(10) Patent No.: US 12,235,246 B2
(45) Date of Patent: Feb. 25, 2025

(54) MEASURING DEVICE, MEASURING SYSTEM, MEASURING METHOD, AND PROGRAM

(71) Applicant: MITSUBISHI HEAVY INDUSTRIES, LTD., Tokyo (JP)

(72) Inventors: Yasutaka Fuke, Tokyo (JP); Hirone Komatsu, Tokyo (JP); Yuichi Sekine, Tokyo (JP); Hideo Yoda, Yokohama (JP); Juichi Kodera, Yokohama (JP); Eiji Saito, Yokohama (JP); Shinichi Kobayashi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 261 days.

(21) Appl. No.: 17/944,640

(22) Filed: Sep. 14, 2022

(65) Prior Publication Data

US 2023/0003627 A1 Jan. 5, 2023

Related U.S. Application Data

(63) Continuation of application No. PCT/JP2021/013030, filed on Mar. 26, 2021.

(30) Foreign Application Priority Data

Apr. 9, 2020 (JP) ................................ 2020-070314

(51) Int. Cl.
*G01N 3/42* (2006.01)
*G01B 11/00* (2006.01)
(Continued)

(52) U.S. Cl.
CPC ............. *G01N 3/42* (2013.01); *G01B 11/002* (2013.01); *G06T 7/0002* (2013.01); *H04N 5/272* (2013.01); *H04N 23/695* (2023.01)

(58) Field of Classification Search
CPC .. G01N 3/42; G01N 2203/0647; G01N 3/068; G01N 2203/0078;
(Continued)

(56) References Cited

U.S. PATENT DOCUMENTS 5,062,293 A * 11/1991 Bakirov ................. G21C 17/00
 73/83
6,301,956 B1 10/2001 Fujita et al.
2018/0284000 A1 * 10/2018 Koshimizu ............ G01N 3/068

FOREIGN PATENT DOCUMENTS

JP H09-273983 A 10/1997
JP 2000-146794 A 5/2000
(Continued)

OTHER PUBLICATIONS

International Search Report dated Jun. 1, 2021, issued in counterpart International application No. PCT/JP2021/013030, with English translation. (6 pages).
(Continued)

*Primary Examiner* — Xin Y Zhong
(74) *Attorney, Agent, or Firm* — WHDA, LLP

(57) ABSTRACT

Provided is a measuring device for measuring the hardness of a rotor blade groove. This measuring device comprises: a hardness meter for measuring hardness; an actuator that presses the hardness meter to an object to be measured; a camera for capturing an image of a measurement range in the object to be measured by the hardness meter; a movement mechanism for moving the hardness meter and the camera to a desired position within the measurement range; and a fixing member for fixing the movement mechanism to the object to be measured.

13 Claims, 11 Drawing Sheets

(51) Int. Cl.
*G06T 7/00* (2017.01)
*H04N 5/272* (2006.01)
*H04N 23/695* (2023.01)

(58) Field of Classification Search
CPC ..... G01N 2203/0206; G01N 2203/021; G01N 2203/027; G01B 11/002; G06T 7/0002; G06T 11/00; H04N 5/272; H04N 23/695
See application file for complete search history.

(56) References Cited

FOREIGN PATENT DOCUMENTS

| | | | |
|---|---|---|---|
| JP | 2000-180330 | A | 6/2000 |
| JP | 2003-166923 | A | 6/2003 |
| JP | 2003-315251 | A | 11/2003 |
| JP | 2014-126445 | A | 7/2014 |
| JP | 2014-202534 | A | 10/2014 |
| JP | 2020-118566 | A | 8/2020 |

OTHER PUBLICATIONS

Written Opinion dated Jun. 1, 2022, issued in counterpart International application No. PCT/JP2021/013030, with English translation. (10 pages).

* cited by examiner

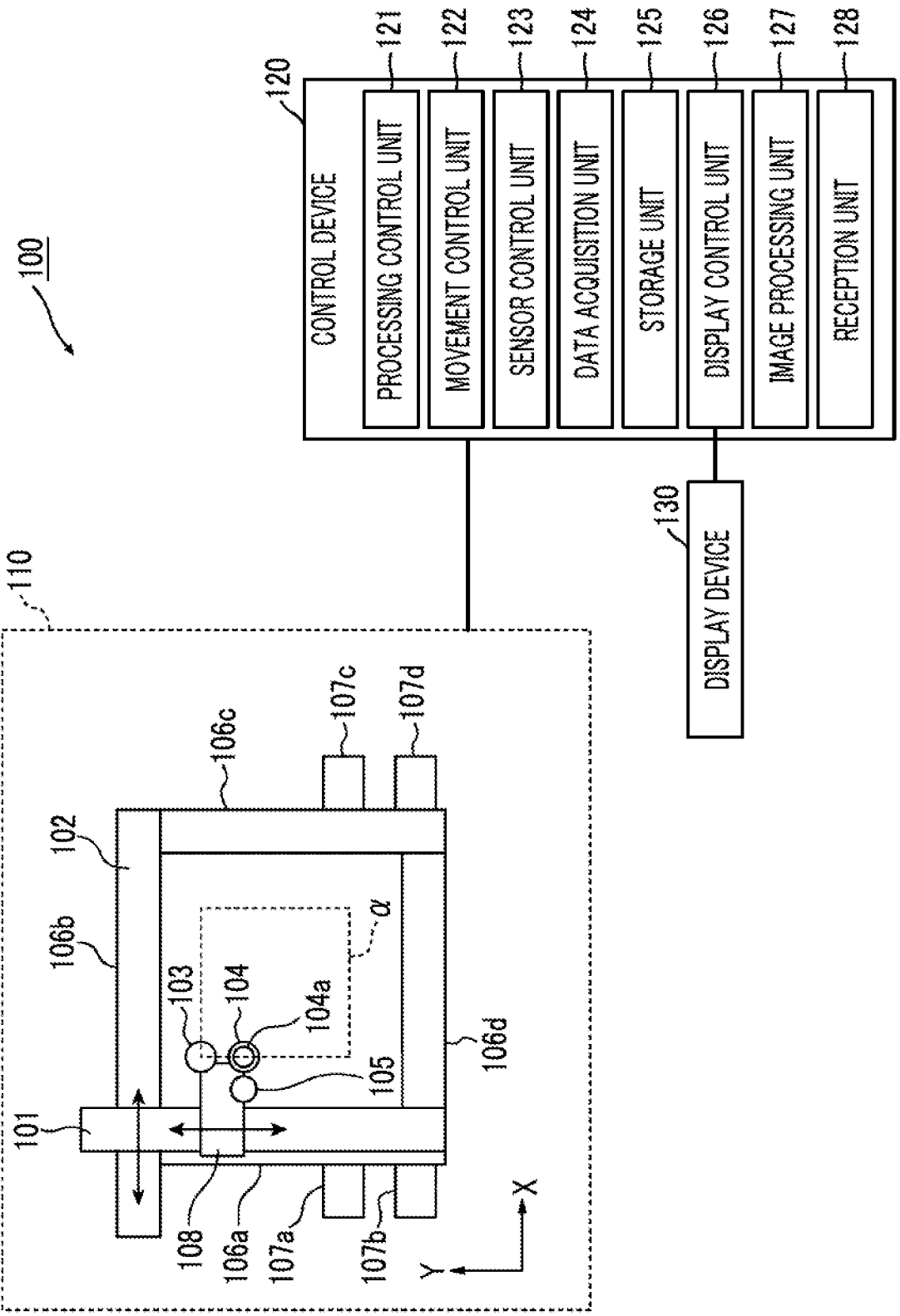

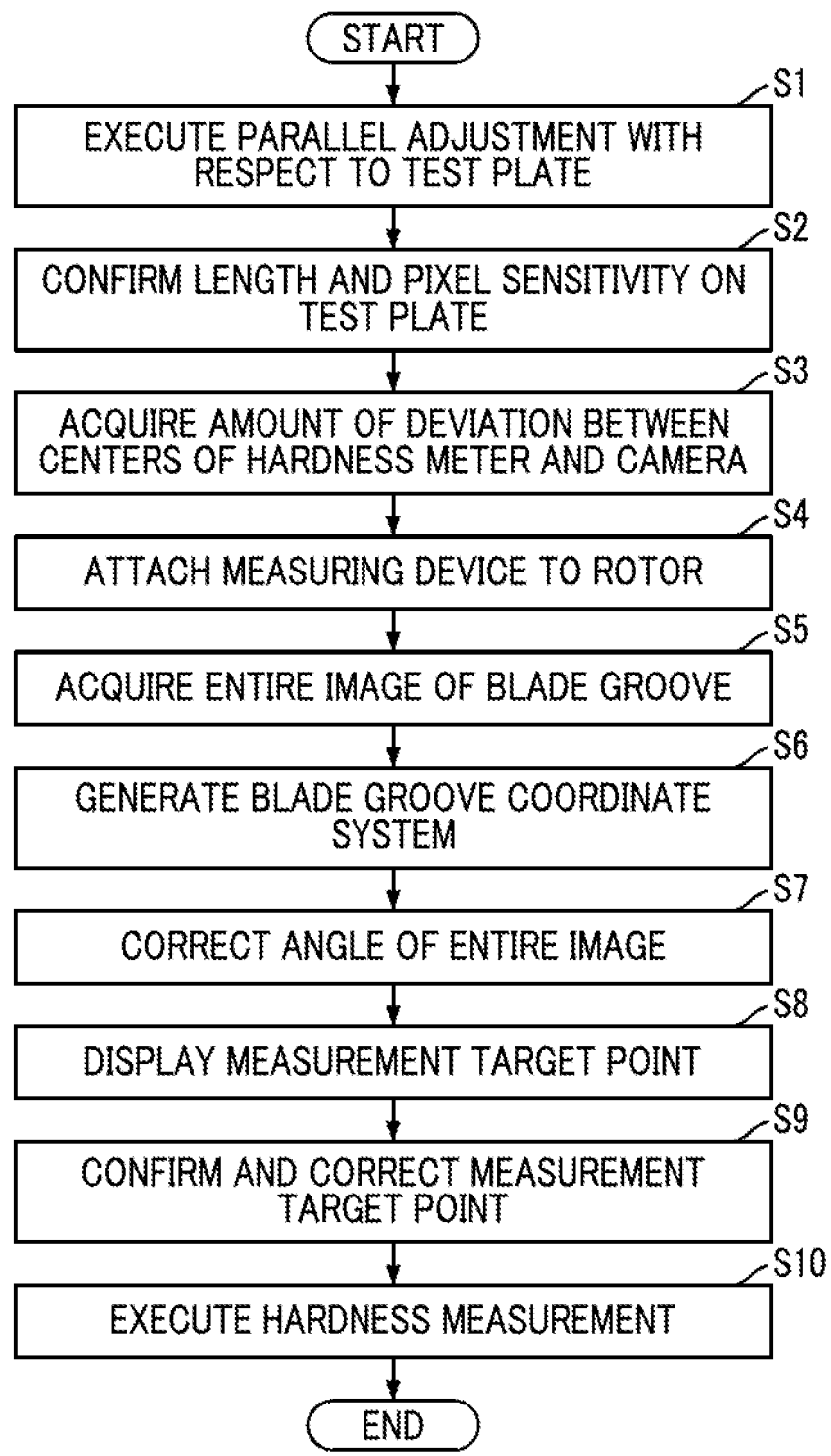

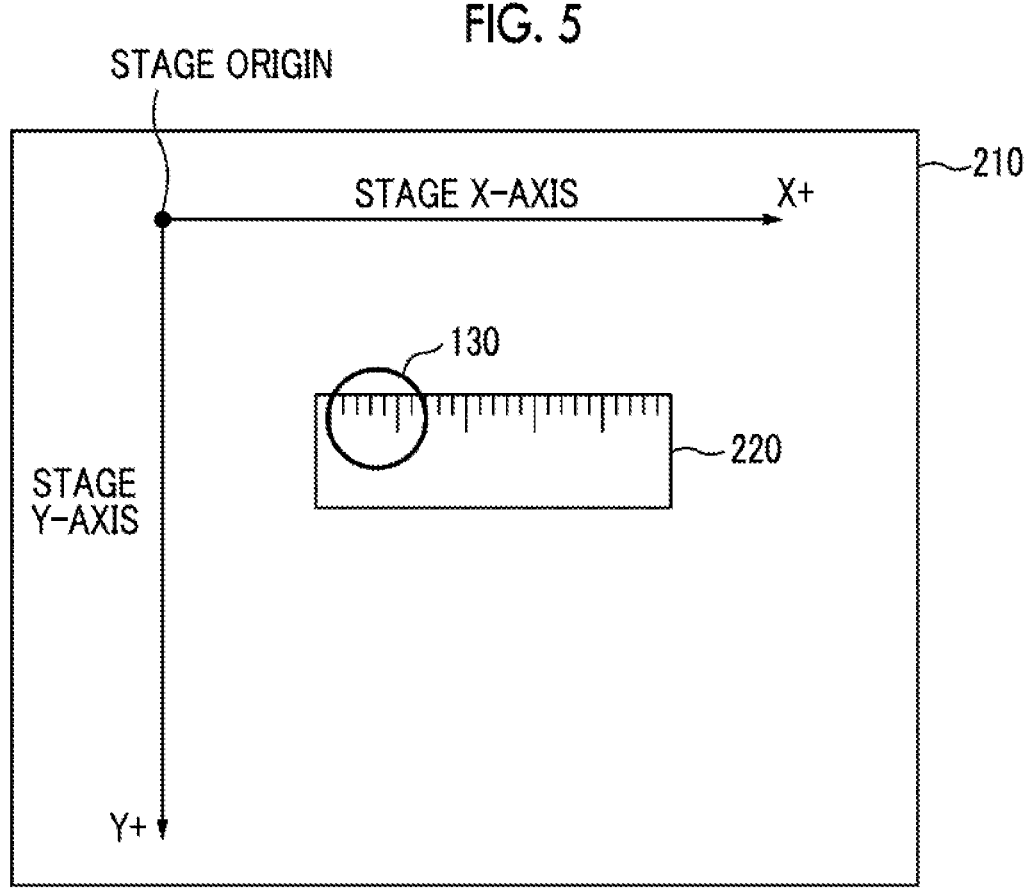

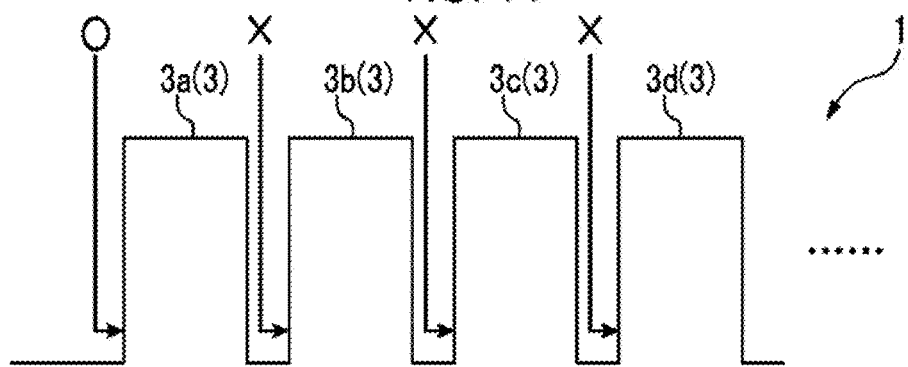
FIG. 11  PRIOR ART
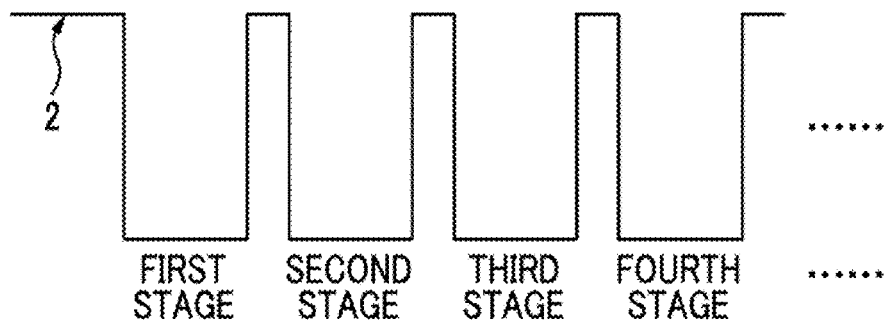

MEASURING DEVICE, MEASURING SYSTEM, MEASURING METHOD, AND PROGRAM

Priority is claimed on Japanese Patent Application No. 2020-070314, filed in Japan on Apr. 9, 2020. The present application is a continuation application of International Application No. PCT/JP2021/013030 filed claiming priority based on Japanese Patent Application No. 2020-070314, and the content of the Application No. PCT/JP2021/013030 is incorporated herein by reference.

TECHNICAL FIELD

The present invention relates to a hardness measuring device, a measuring system, a measuring method, and a program.

BACKGROUND ART

It is known that the hardness of a rotor blade groove of a steam turbine is related to the remaining life of the rotor. A method of measuring the hardness of the rotor blade groove will be described with reference to FIGS. 11 and 12. FIGS. 11 and 12 show schematic views of a rotor 2 of a steam turbine 1. As shown in FIG. 11, the rotor 2 has a plurality of blade rows 3 (for example, a first stage blade row 3a, a second stage blade row 3b, a third stage blade row 3c, a fourth stage blade row 3d, and the like). FIG. 12 shows an enlarged view of a part of the blade row 3 when the rotor 2 is viewed from an axial direction. As shown in FIG. 12, the rotor 2 has a substantially cylindrical rotor body 10 extending along an axis O, a disk 20 provided to surround an outer periphery of the rotor body 10, and a plurality of rotor blades 30 arranged in a circumferential direction along an outer peripheral surface of the disk 20. On the outer peripheral surface of the rotor body 10, a plurality of rotor blades 30 are provided along the circumferential direction of the rotor 2 via the disk 20. The plurality of rotor blades 30 form a blade row 3 for one stage shown in FIG. 11. As shown in FIG. 12, a plurality of blade grooves 40 arranged at intervals along the circumferential direction of the disk 20 are formed on the outer peripheral surface of the disk 20. Each blade groove 40 is formed to be recessed inward in a diameter direction from the outer peripheral surface of the disk 20, and the blade groove 40 penetrates the disk 20 in the axis O direction. A plurality of teeth that are continuous in the shape of a saw blade are formed in the blade groove 40, forming a Christmas tree shape as a whole. A blade root 31 of the rotor blade 30 has a shape corresponding to the Christmas tree shape of the blade groove 40. In other words, the rotor blade 30 is fixed on the rotor 2 via the disk 20 by the teeth of the blade groove 40 and the blade root 31 meshing with each other, and the rotor blade 30 is supported without falling off even when a centrifugal force is applied to the rotor blade 30 while the rotor 2 is rotating.

In the remaining creep life evaluation of the rotor 2, a plurality of measurement points are set for one blade groove 40 to measure the hardness. At the time of measurement, it is desired to measure the hardness of the blade groove 40 without removing the blade row 3 from the disk 20. For example, after the rotor 2 is suspended from a passenger compartment (not shown) and is placed on a cradle, as shown by an arrow in FIG. 11, there is a need for a person to insert a hardness meter through a gap between the blade rows 3 and the blade row 3 on an outer side in the radial direction and to press the hardness meter against the measurement point of the blade groove 40 for inspection.

As a related technology, PTL 1 discloses a technology for quantitatively inspecting the shape of the entire rotor blade of a turbine.

CITATION LIST

Patent Literature

[PTL 1] Japanese Unexamined Patent Application Publication No. 2014-202534

SUMMARY OF INVENTION

Technical Problem

A work space for a person to attach a hardness meter is ensured for the blade groove 40 related to the first stage blade row 3a shown in FIG. 11. However, in the blade groove 40 related to the second stage blade row 3b to the fourth stage blade row 3d, the interval between the blade row 3 and the blade row 3 is a narrow gap. Therefore, it is difficult to manually set the tip of the hardness meter at the measurement point and to perform measurement.

In addition, it is difficult to manually acquire hardness distribution data within a limited inspection time by accurately positioning the tip of the hardness meter with respect to the point to be measured in the blade groove.

Therefore, an object of the present invention is to provide a measuring device, a measuring system, a measuring method, and a program capable of solving the above-described problems.

Solution to Problem

According to an aspect of the present disclosure, there is provided a measuring device including: a hardness meter for measuring hardness; an actuator that presses the hardness meter against an object to be measured; a camera for capturing an image of a measurement range in the object to be measured; a movement mechanism for moving the hardness meter and the camera to a desired position within the measurement range; and a fixing member for fixing the movement mechanism to the object to be measured.

According to another aspect of the present disclosure, there is provided a measuring system including: the above-described measuring device; and a control device of the measuring device, in which the control device includes a movement control unit that controls the movement mechanism, an image processing unit that generates a superimposed image showing a position of a target measurement point superimposed on an image of the measurement range captured by the camera, and a display control unit that outputs the superimposed image.

According to still another aspect of the present disclosure, there is provided a measuring method by the above-described measuring device, the method including: a step of generating a superimposed image showing a position of a target measurement point superimposed on an image of the measurement range captured by the camera; a step of displaying the superimposed image; a step of converting first coordinate information indicating the position of the measurement point in a first coordinate system set for the superimposed image, into second coordinate information in a second coordinate system set for a range in which the movement mechanism moves; a step of acquiring a confirmation result for the superimposed image; a step of moving the hardness meter to the position indicated by the second coordinate information when the confirmation result does not include the movement of the measurement point; and a step of performing measurement with the hardness meter.

According to still another aspect of the present disclosure, there is provided a program for causing a computer that controls the above-described measuring device to execute a step of generating a superimposed image showing a position of a target measurement point superimposed on an image of the measurement range captured by the camera, a step of displaying the superimposed image, a step of converting first coordinate information indicating the position of the measurement point in a first coordinate system set for the superimposed image, into second coordinate information in a second coordinate system set for a range in which the movement mechanism moves, a step of acquiring a confirmation result for the superimposed image, a step of moving the hardness meter to the position indicated by the second coordinate information when the confirmation result does not include the movement of the measurement point, and a step of performing measurement with the hardness meter.

Advantageous Effects of Invention

According to the above-described measuring device, measuring system, measuring method, and program, the hardness of the blade groove can be measured with the blade mounted on the rotor.

BRIEF DESCRIPTION OF DRAWINGS

FIG. 1 is a block diagram showing an example of a measuring system according to an embodiment of the present disclosure.

FIG. 3 is a flowchart showing an example of a hardness measurement process according to the embodiment of the present disclosure.

FIG. 5 is a diagram used for describing S2 of the hardness measurement process according to the embodiment of the present disclosure.

FIG. 11 is a schematic view of a side cross section of the rotor of a steam turbine.

DESCRIPTION OF EMBODIMENTS

Embodiment (System Configuration)

Figure 2A:
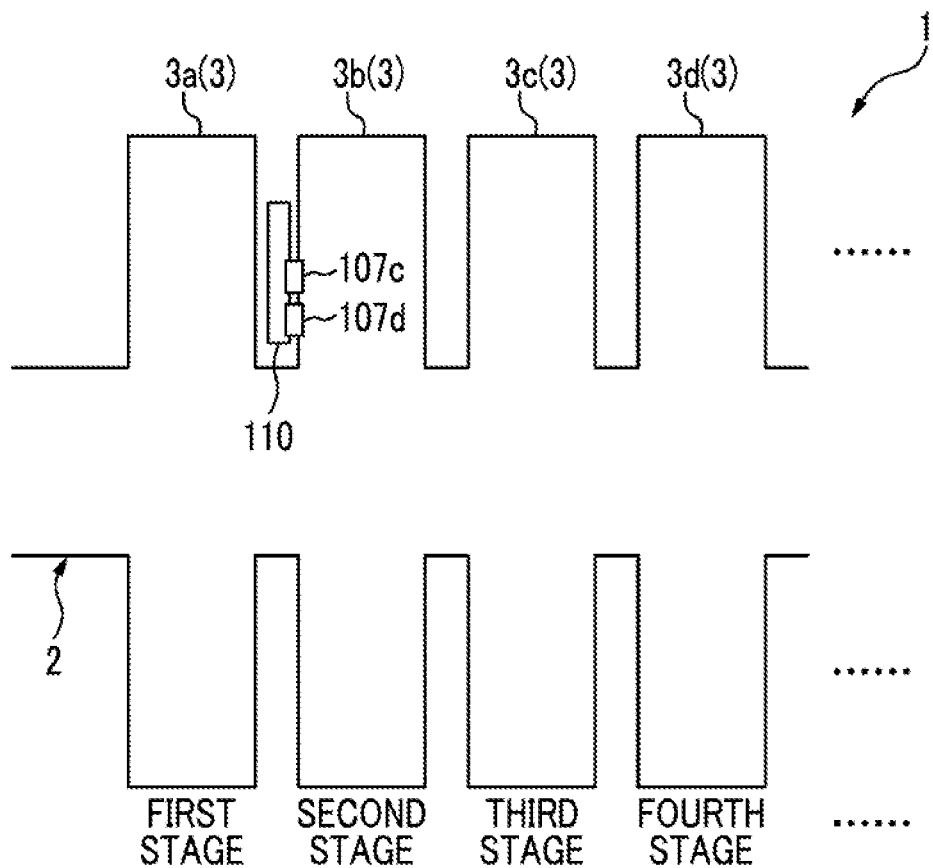
FIG. 2A is a first diagram showing a state where the measuring system of the present disclosure is attached to a rotor.

Hereinafter, a measuring system according to the embodiment of the present disclosure will be described with reference to FIGS. 1 to 13.

FIG. 1 shows an example of a measuring system 100. The measuring system 100 is a system for measuring the hardness of a blade groove 40 in a rotor 2 of a steam turbine. The measuring system 100 includes a measuring device 110 which is the main body of the measuring device, and a control device 120 which controls the measuring device 110.

(Functional Configuration of Measuring Device Main Body)

FIG. 1 shows a plan view of the measuring device 110. The measuring device 110 is formed of, for example, frame members 106a to 106d on four sides and has a rectangular shape with an open center portion. On two orthogonal sides of the four sides, an actuator 101 and an actuator 102 are provided with sliders which are movable in each side direction. For example, the actuator 101 is provided in parallel with a frame member 106a forming one side in a Y-axis direction, and the actuator 102 is fixedly provided on a frame member 106b forming one side in an X-axis direction. The actuator 101 is fixed to the slider of the actuator 102, and by moving this slider, the actuator 101 can move in the X-axis direction. A header 108 including sensors used for hardness measurement is fixed to the slider of the actuator 101, and the header 108 is provided with a camera 103, a hardness meter 104, and a laser range finder 105. The camera 103 and the hardness meter 104 can be moved in the Y-axis direction by moving the header 108 fixed to the slider of the actuator 101. In other words, by driving the sliders of the actuators 101 and 102, the camera 103 and the hardness meter 104 can freely move within the range of a region α shown in the drawing. The camera 103, the hardness meter 104, and the laser range finder 105 are installed to face a depth direction of the paper surface. The camera 103 captures an image of the blade groove 40. The hardness meter 104 measures the hardness of the blade groove 40. The hardness meter 104 is an ultrasonic type or image measurement type hardness meter. The hardness meter 104 includes an actuator 104a (for example, an air cylinder), and is configured to press a tip portion of the hardness meter 104 against the blade groove 40 by driving the actuator 104a. The laser range finder 105 measures the distance to the disk 20. For example, the header 108 is moved to each vertex of the region α, and the distance from the laser range finder 105 to the disk 20 is measured at each vertex. Thereby, the tilt of a plane (XY stage) formed by the movement of the header 108 and by the disk 20 to which the measuring device 110 is attached can be computed. The frame member 106a is provided with fixing members 107a and 107b for attaching the measuring device 110 to the disk 20. Similarly, the frame member 106c is provided with fixing members 107c and 107d. For example, permanent magnets, electromagnets, and the like are provided on the fixing members 107a to 107d, and the measuring device 110 is suctioned and fixed to the rotor 2 by these magnets. The fixing members 107a to 107d are provided with a height adjustment mechanism that can adjust the distance between the suction destination (rotor 2 and the like) of the measuring device 110 and the measuring device 110.

Figure 2B:
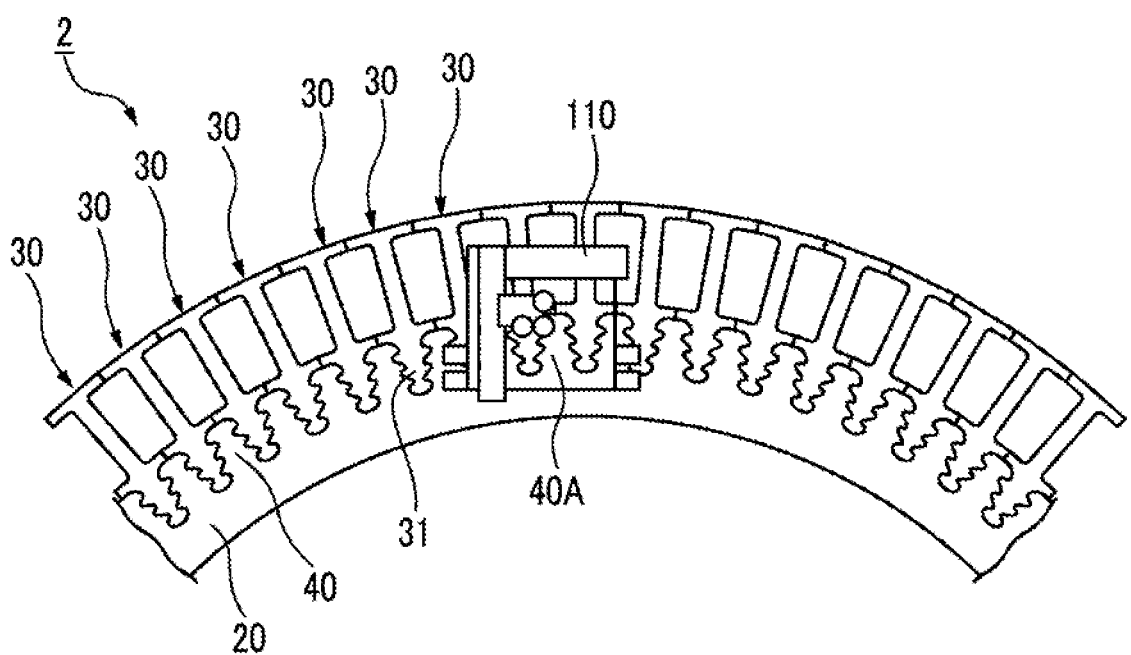
FIG. 2B is a second diagram showing a state where the measuring system of the present disclosure is attached to the rotor.

FIGS. 2A and 2B show a state when the measuring device 110 is attached to the rotor 2.

As shown in FIG. 2A, the measuring device 110 can be inserted even in a narrow portion of the blade row 3 and the blade row 3 in the second and subsequent stages, and the fixing members 107a to 107d can be fixed to the blade row 3b to be measured for hardness. As shown in FIG. 2B, by attaching the measuring device 110 such that a blade groove 40A to be measured is included in the region α, the hardness meter 104 can be positioned at a desired position of the blade groove 40A, and hardness measurement can be performed.

(Functional Configuration of Control Device)

The control device 120 includes a processing control unit 121, a movement control unit 122, a sensor control unit 123, a data acquisition unit 124, a storage unit 125, a display control unit 126, an image processing unit 127, and a reception unit 128.

The processing control unit 121 controls the hardness measurement process. For example, the processing control unit 121 may execute the hardness measurement process according to the procedure, or may perform the coordinate conversion of a coordinate system provided for an image captured by the camera 103, a CAD data coordinate system described later, and a coordinate system provided for an XY stage (a plane on which the camera 103 and hardness meter 104 move). (The coordinate system provided for the XY stage is, for example, a coordinate system in which the origin of the stage in FIG. 4, which will be described later, is the origin, and the X-axis and the Y-axis directions of the stage shown in the drawing are the X-axis and the Y-axis, respectively.)

The movement control unit 122 controls the actuator 101 and the actuator 102 to move the header 108 to a desired position.

The sensor control unit 123 controls the operations of the camera 103, the hardness meter 104, and the laser range finder 105. For example, the sensor control unit 123 instructs the camera 103 to capture an image. The sensor control unit 123 performs measurement by the hardness meter 104 by driving the actuator 104a provided on the hardness meter 104 or the like.

The data acquisition unit 124 acquires an image captured by the camera 103, a hardness measurement result measured by the hardness meter 104, and the like.

The storage unit 125 stores various data acquired by the data acquisition unit 124 and CAD data. The CAD data includes the design data of the rotor 2 (coordinate data of the shape of the rotor 2) and the coordinate data of the measurement point for measuring the hardness.

The display control unit 126 creates various images to be presented to a worker who performs the measurement work, and displays the images on a display device 130.

The image processing unit 127 generates a superimposed image in which the measurement target point is superimposed on the image captured by the camera 103, and corrects the measurement target point based on the change instruction of the worker (moves the position of the superimposed and displayed measurement target point).

The reception unit 128 receives an operation of the worker on the control device 120, and outputs a predetermined control signal corresponding to the operation to the processing control unit 121 or the like.

<Hardness Measurement Process>

Next, the hardness measurement process using the measuring system 100 will be described with reference to FIGS. 3 to 10.

FIG. 3 is a flowchart showing an example of the hardness measurement process according to the embodiment of the present disclosure.

First, parallel adjustment is performed with respect to a test plate (step S1).

Figure 4:
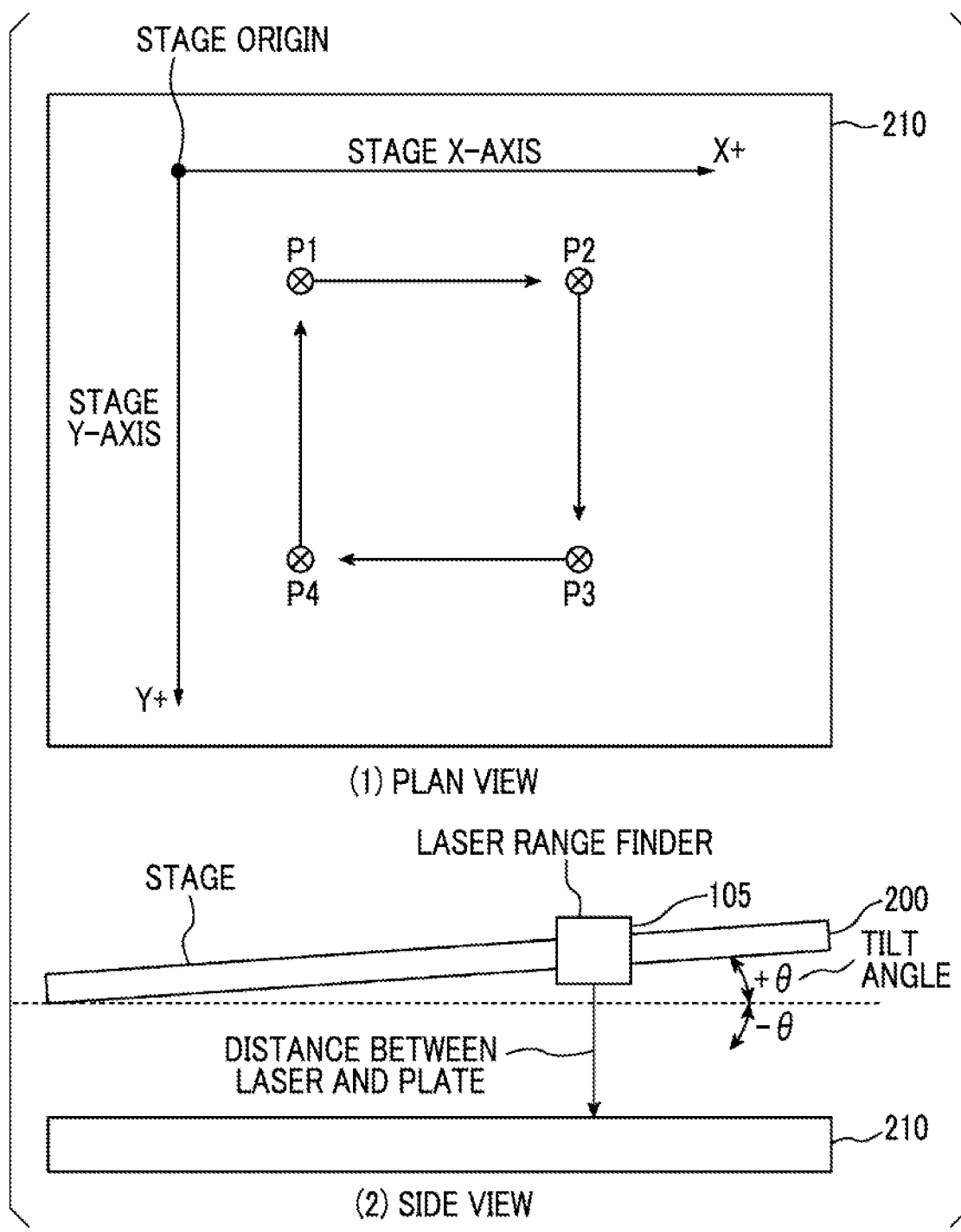
FIG. 4 is diagram used for describing S1 of the hardness measurement process according to the embodiment of the present disclosure.

The upper part of FIG. 4 shows the moving direction of the header 108, and the lower part of FIG. 4 shows the relationship between an XY stage 200 and an attachment destination (test plate 210) of the measuring device 110. First, the worker attaches the measuring device 110 to the test plate 210. Next, the processing control unit 121 executes the following process via the operation of the worker with respect to the control device 120. First, the sensor control unit 123 turns on the laser range finder 105. The movement control unit 122 moves the header 108 in the order of P1, P2, P3, and P4 as shown in the upper part of FIG. 4. At P1, P2, P3, and P4, the laser range finder 105 measures the distance from the laser range finder 105 to the test plate 210. The data acquisition unit 124 acquires the distances measured at P1 to P4 and outputs the acquired distances to the processing control unit 121. The processing control unit 121 computes tilt angles θ1 to θ4 with respect to the test plate 210 of the XY stage 200 based on the output difference of the laser range finder at each position of P1 and P2, P2 and P3, P3 and P4, and P4 and P1. For example, the tilt angle θ1 is an angle based on the output difference between P1 and P2, the tilt angle θ2 is an angle based on the output difference between P2 and P3, the tilt angle θ3 is an angle based on the output difference between P3 and P4, and the tilt angle θ4 is an angle based on the output difference between P4 and P1. The processing control unit 121 outputs the computed tilt angles θ1 to θ4 to the display control unit 126. The display control unit 126 displays the tilt angles θ1 to θ4 on the display device 130. The worker adjusts the adjustment mechanism of the fixing members 107a to 107d such that the tilt angles θ1 to θ4 are all within the allowable tilt angle, and adjusts the attaching height.

Next, the length and pixel sensitivity on the test plate 210 are confirmed (step S2).

First, as shown in FIG. 5, the worker installs a glass scale 220 on the test plate 210 in the field of view of the camera 103. The glass scale 220 is transparent and has a scale engraved in units of 1 mm, for example. Next, the processing control unit 121 executes the following process via the operation of the worker with respect to the control device 120. The sensor control unit 123 causes the camera 103 to capture an image. The data acquisition unit 124 acquires an image captured by the camera 103 and outputs the acquired image to the processing control unit 121. The processing control unit 121 computes the relationship between the pixels constituting the image captured by the camera 103 and the scale of the glass scale. For example, the processing control unit 121 computes that N pixels per 1 mm, that is, one pixel, corresponds to a size of 1/N mm.

Next, the amount of deviation between the centers of the hardness meter 104 and the camera 103 is acquired (step S3).

The worker performs a predetermined operation of instructing the control device 120 to compute the positional relationship between the hardness meter 104 and the camera 103. The reception unit 128 receives this operation, and the processing control unit 121 executes the following process. The sensor control unit 123 operates the hardness meter 104 to perform a trial hit. By trial hit, the tip of the hardness meter 104 is pressed against the test plate 210, and indentations are formed on the surface of the test plate 210. The movement control unit 122 stores the information of the X coordinate and the Y coordinate in the XY stage 200 of the camera 103 at the time of the trial hit in the storage unit 125. Next, the movement control unit 122 moves the camera 103 to the position where the indentation is formed, and the sensor control unit 123 causes the camera 103 to capture an image. The image processing unit 127 determines whether or not an indentation appears at the center of the image captured by the camera 103. The processing control unit 121 causes the movement control unit 122 and the sensor control unit 123 to repeatedly move the camera 103 and capture the indentation until the indentation appears at the center of the image. When an indentation appears at the center of the image, the movement control unit 122 stores the coordinate information in the XY stage of the camera 103 at this time in the storage unit 125. The processing control unit 121 obtains the amount of deviation ($\Delta X$, $\Delta Y$) between the position of the hardness meter 104 and the center position of the camera 103 from the amount of movement of the XY stage. Specifically, the processing control unit 121 computes the difference ($\Delta X$, $\Delta Y$) between the coordinate information when an indentation appears at the center of the image and the coordinate information when the trial hit is performed.

Next, the measuring device 110 is attached to the rotor 2 (step S4).

The worker attaches the measuring device 110 to the rotor 2. The worker visually confirms that there is no gap or rattling between the magnets of the fixing members 107*a* to 107*d* and the suction surface of the rotor 2. When the measuring device 110 is attached to the rotor 2, the worker confirms that the tilt angles $\theta 1$ to $\theta 4$ are within a predetermined angle via the same procedure as in step S1.

Next, the entire image of the blade groove 40 is acquired (step S5).

Since the distance between the camera 103 and the rotor 2 is short and the magnification of the camera is high, it is not possible to capture an image of the entire blade groove 40 at one time. Therefore, a plurality of local images are captured, and the local images are combined to obtain an entire image.

Figure 6C:
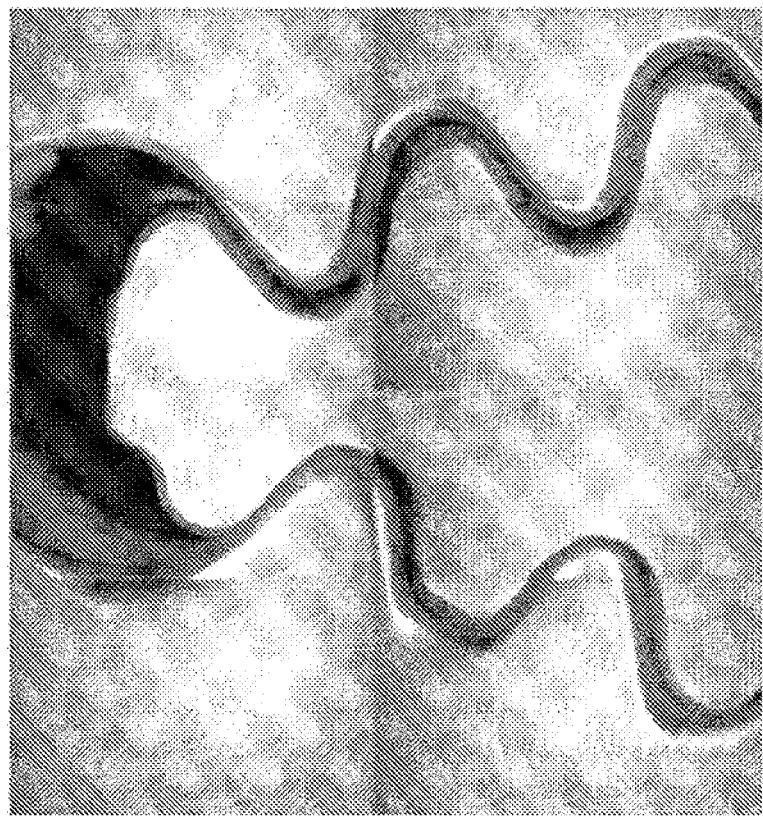
FIGS. 6A, 6B, and 6C are diagrams used for describing S5 of the hardness measurement process according to the embodiment of the present disclosure.
Figure 6A:
Figure 6B:
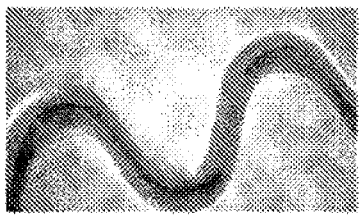
Figure 7:
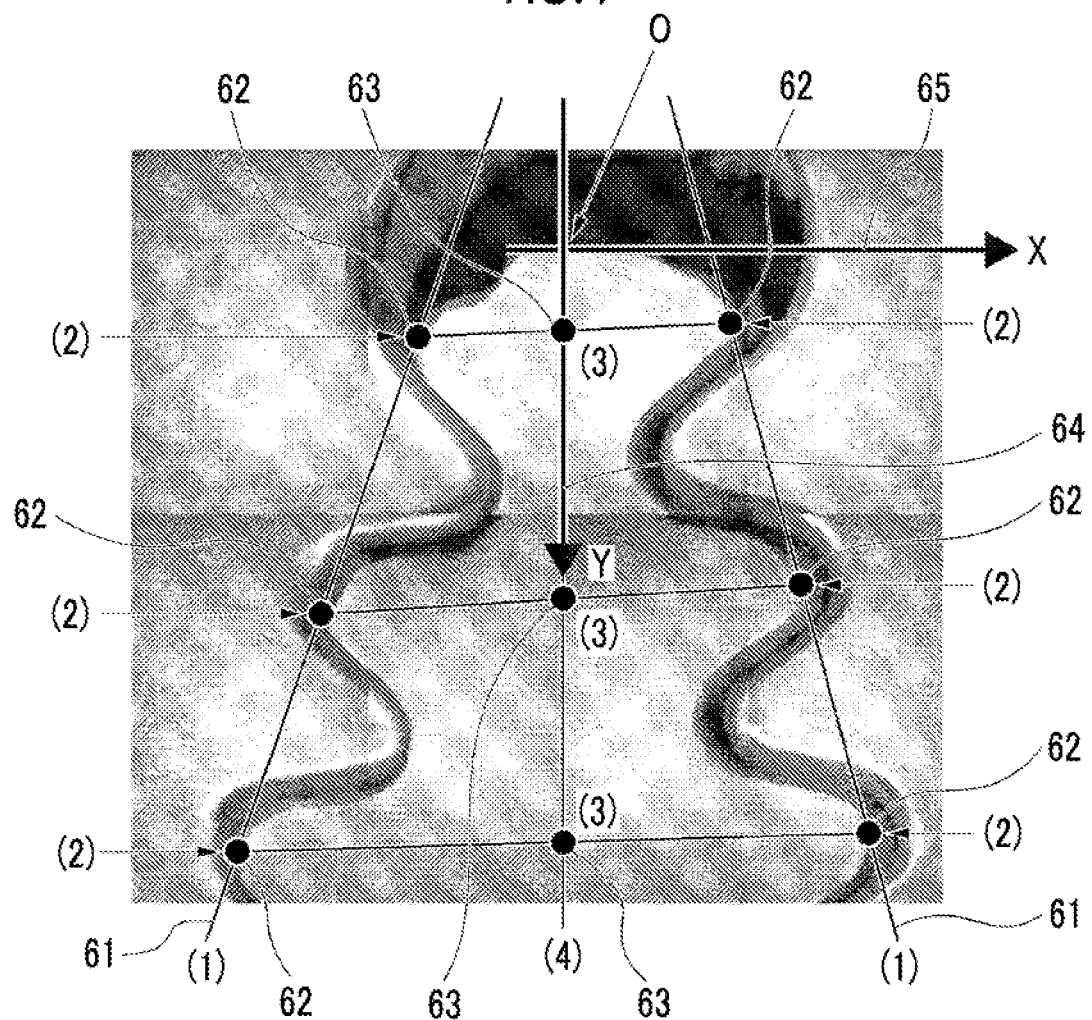
FIG. 7 is a diagram used for describing S6 of the hardness measurement process according to the embodiment of the present disclosure.

The worker performs a predetermined operation of instructing the control device 120 to acquire the entire image of the blade groove 40. The reception unit 128 receives this operation, and the processing control unit 121 executes the following process. The movement control unit 122 moves the camera 103 to a predetermined position, and the sensor control unit 123 causes the camera 103 to capture local images of the blade groove 40. An example of the local image is shown in FIGS. 6A and 6B. The data acquisition unit 124 acquires local images. The capturing position of the local image is predetermined such that the plurality of local images are combined to obtain the entire image of the blade groove 40. For example, the capturing position is given as the coordinate data of the XY stage, and the movement control unit 122 moves the camera 103 to the position indicated by the coordinate data and causes the sensor control unit 123 to capture an image. When the local image can be captured, the image processing unit 127 combines the local images to generate an entire image. For example, the image processing unit 127 appropriately combines local images based on the coordinate data of the capturing position in the XY stage and on the length per one pixel computed in step S2 to generate an entire image. An example of the entire image is shown in FIG. 6C. The display control unit 126 displays the entire image on the display device 130.

Next, the blade groove coordinate system is generated (step S6).

The worker looks at the entire image displayed on the display device 130, and generates the blade groove coordinate system via the following work. The procedure of step S6 will be described with reference to FIG. 7. (1) to (4) in FIG. 7 correspond to the following (1) to (4).

(1) The worker manually draws a blade groove tangent line 61 on the entire image. The reception unit 128 receives this operation, and the image processing unit 127 generates an image in which the blade groove tangent line 61 is displayed on the entire image.

(2) The worker manually sets a contact point 62 between the blade groove tangent line 61 and the blade groove 40. The reception unit 128 receives this operation, and the image processing unit 127 generates an image in which the contact point 62 is displayed on the image generated in (1).

(3) The worker sets a middle point 63 of the line segment connecting the contact point 62. The reception unit 128 receives this operation, and the image processing unit 127 generates an image in which the middle point 63 is displayed on the image generated in (2).

(4) The worker draws an approximate straight line (Y-axis 64) connecting the middle point 63. The reception unit 128 receives this operation, and the image processing unit 127 generates an image in which the Y-axis 64 is displayed on the image generated in (3).

(5) The worker manually sets the intersection between the Y-axis 64 and the top of the blade groove 40 as an origin O. The reception unit 128 receives this operation, and the image processing unit 127 generates an image which passes through the set origin O and which displays an X-axis 65 orthogonal to the Y-axis 64, on the image generated in (4).

When the above processing is difficult, the shape (profile) of the blade groove is used as a template and is superimposed and displayed on the entire image of the template image, and the blade groove image coordinates and the CAD coordinates (blade groove coordinates) are calibrated.

The image processing unit 127 may automatically perform the process by the worker in (1) to (5) in step S6. For example, in the case of (1), the image processing unit 127 detects the contour of the blade groove 40 from the entire image and draws the blade groove tangent line 61.

In the cases of (2) to (3), the image processing unit 127 detects the contact point 62 and connects the contact points 62 having similar coordinate positions in the paper surface height direction (the Y-axis direction to be set later) to set the middle point 63. In the cases of (4) to (5), the image processing unit 127 connects the middle point 63 to set the Y-axis 64, and detects the top of the blade groove 40 based on the space (black) around the top, and the like, to set the X-axis 65.

The coordinate system on the image created in step S6 is called a blade groove coordinate system.

Next, the angle of the entire image of the blade groove 40 is corrected (step S7).

The image processing unit 127 adjusts the tilt of the entire image such that the tilt (tilt with respect to the vertical direction or the horizontal direction) of the blade groove coordinate system becomes 0°.

Next, the measurement target point is displayed (step S8).

Figure 8:
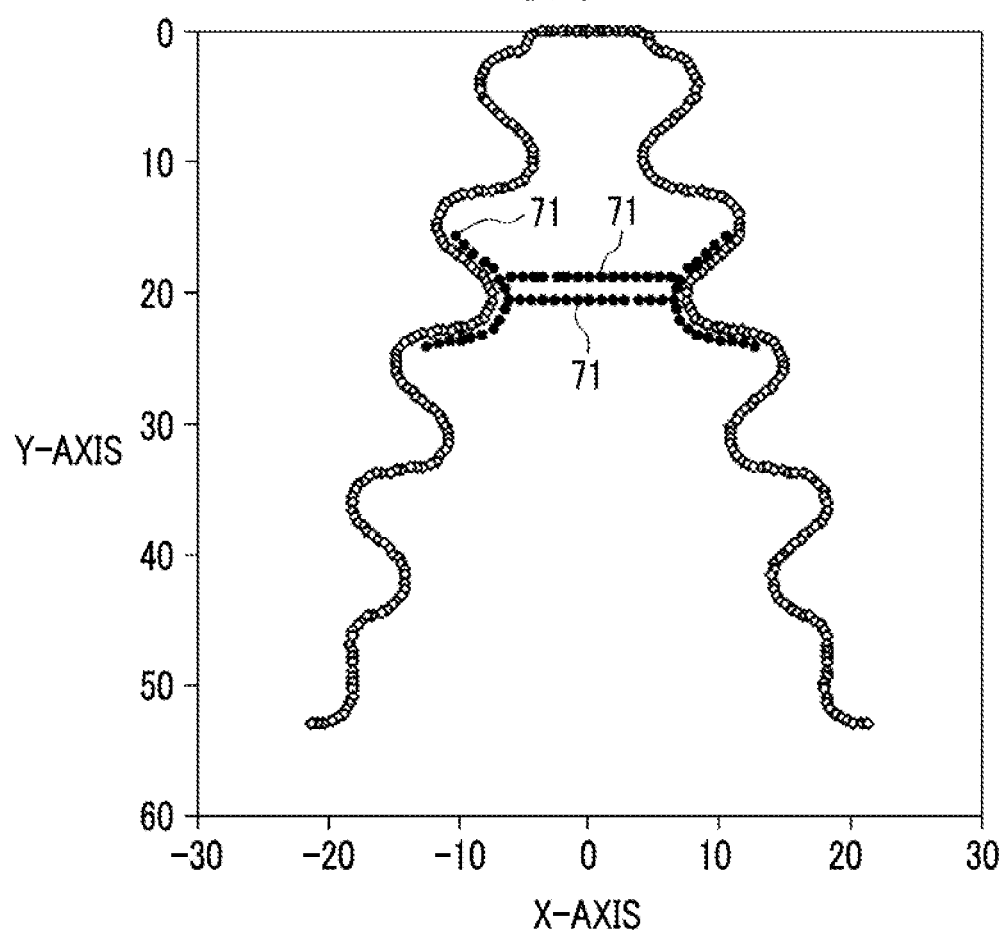
FIG. 8 is a diagram showing an example of CAD data according to the embodiment of the present disclosure.
Figure 9:
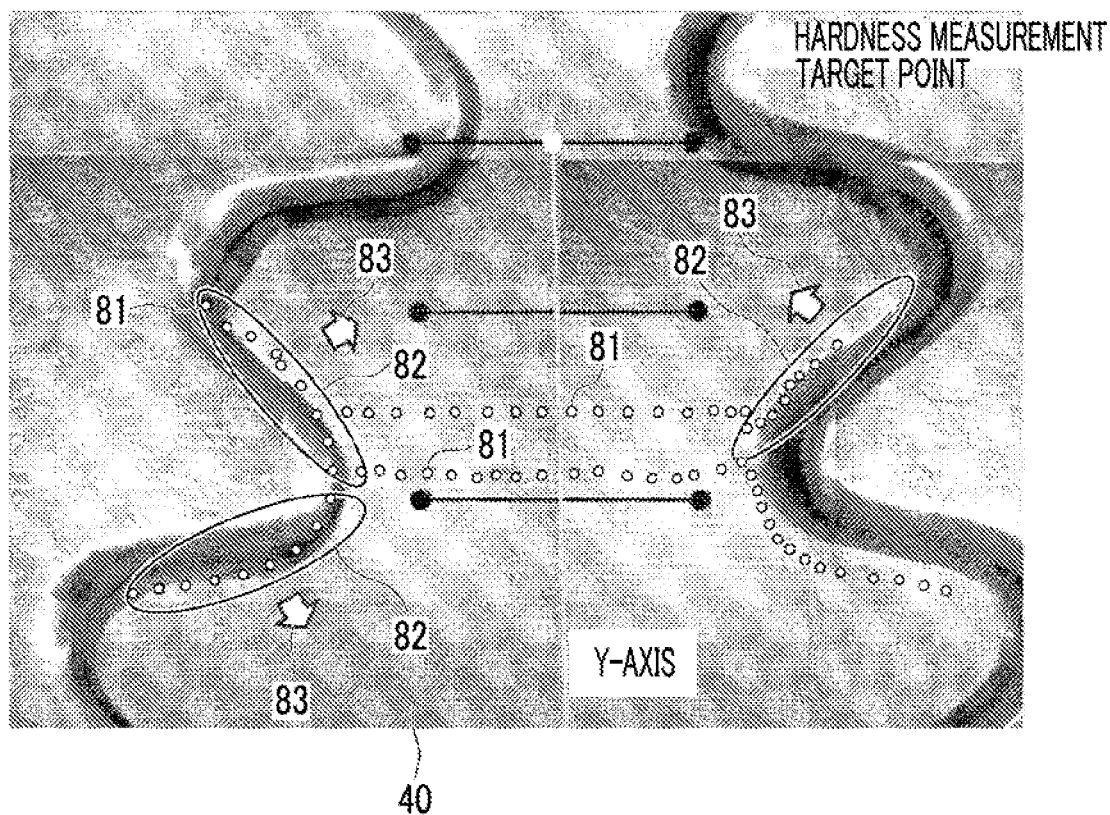
FIG. 9 is a diagram used for describing S8 and S9 of the hardness measurement process according to the embodiment of the present disclosure.

The image processing unit 127 reads CAD data from the storage unit 125 and superimposes the read CAD data on the entire image. The CAD data includes design data indicating the shape of the blade groove 40 to be measured for hardness and coordinate data of measurement points in the blade groove 40. The image processing unit 127 specifies a position corresponding to the origin determined in step S6 in the CAD data, and sets an XY coordinate axis with the specified position as the origin in the CAD data space in the same manner as in the blade groove coordinate system. Then, the image processing unit 127 converts the positions of a plurality of measurement points included in the CAD data into coordinate data in the blade groove coordinate system, and generates an image in which a mark indicating the measurement target point is displayed at the corresponding coordinate positions on the entire image. An example of the CAD data is illustrated in FIG. 8. Circle points, partly marked with a reference numeral 71 are predetermined measurement target points. FIG. 9 shows an example of a superimposed image in which a mark indicating a measurement target point is superimposed and displayed on the entire image. Circle points, partly marked with a reference numeral 81 are superimposed and displayed measurement target points. The display control unit 126 displays the superimposed image in which the mark indicating the measurement target point is displayed, on the display device 130.

Next, the measurement target point is confirmed and corrected (step S9).

The worker confirms the superimposed image illustrated in FIG. 9. The worker visually confirms whether the mark is displayed at the correct position according to the measurement point shown in the CAD data. For example, the worker confirms whether the overall left-right, up-down bias and tilt of the measurement target point are within the allowable range. The worker confirms whether or not the measurement target point is hung on an edge of the blade groove 40 or a chamfered portion. In the superimposed image illustrated in FIG. 9, a mark indicating a measurement target point is displayed to overlap the chamfered portion (region 82). Since it is not preferable to leave an indentation on the chamfered portion by the hardness meter 104, the worker selects the marks displayed in the region 82 one by one with a mouse or the like, and moves the marks in the direction indicated by an arrow 83, for example, to perform the movement instruction (correction). The reception unit 128 receives this operation, and the image processing unit 127 moves the mark indicating the measurement target point to the position moved by the worker and displays the mark. The image processing unit 127 computes the coordinate position in the blade groove coordinate system of the mark indicating the measurement target point after the movement. The worker moves the mark indicating the measurement target point until the measurement target point to be corrected cannot be found.

When it is confirmed that all the measurement points are arranged at appropriate positions, the hardness measurement is executed (step S10).

The execution order of hardness measurement is predetermined. The worker performs an operation of moving the camera 103 to the first measurement target point. The movement control unit 122 controls the actuators 101 and 102 to move the camera 103 to the first measurement target point. The sensor control unit 123 causes the camera 103 to capture an image. The image processing unit 127 superimposes and displays a mark indicating a measurement target point on the image captured by the camera 103. The display control unit 126 displays an image in which the mark indicating the measurement target point is superimposed and displayed on the display device 130. The worker confirms that the center of the camera and the mark indicating the measurement target point are aligned. When the center of the camera 103 and the mark indicating the measurement target point are not aligned, the worker performs a predetermined operation to move the camera 103 and adjust the position of the camera 103. Alternatively, the worker may correct the position of the mark indicating the measurement target point via the same procedure as in step S9. When the mark indicating the measurement target point is at the desired position and the center of the camera 103 and the mark indicating the measurement target point are aligned, the worker instructs the control device 120 to execute the hardness measurement. The processing control unit 121 records the coordinate position of the first measurement target point in the blade groove coordinate system in the storage unit 125 in association with the identification information of the first measurement point. The processing control unit 121 computes the difference between the coordinate position of the header 108 at this time in the XY stage and the coordinate position of the measurement point in the blade groove coordinate system. This difference indicates the relative positional relationship between the coordinate system of the XY stage and the blade groove coordinate system. The processing control unit 121 instructs the movement control unit 122 to move the header 108 by the amount of deviation computed in step S3. The movement control unit 122 moves the header 108 by the amount of deviation computed in step S3 to align the tip position of the hardness meter 104 with the measurement target point. The sensor control unit 123 operates the actuator 104a and presses the hardness meter 104 for measurement. The data acquisition unit 124 records the hardness data measured by the hardness meter 104 in the storage unit 125 in association with the identification information of the first measurement point. Next, the movement control unit 122 moves the header 108 by the amount of deviation computed in step S3 such that the center of the camera 103 is at the position where the tip portion of the hardness meter 104 is hit. When the header 108 moves, the sensor control unit 123 causes the camera 103 to capture an indentation formed by hitting the hardness meter 104. The data acquisition unit 124 records the indentation image captured by the camera 103 in the storage unit 125 in association with the identification information of the first measurement point. When the measurement for the first measurement point is completed, the storage unit 125 stores the coordinate position of the first measurement point in the blade groove coordinate system, the measured value of the hardness data, and the indentation image. The indentation image is acquired as evidence that the hardness was measured at the correct position. After acquiring the indentation image, it is possible to verify whether or not the hardness can be measured at a position that is not separated from the target measurement point by analyzing the indentation image later.

When the measurement of the first measurement point is completed, the worker instructs the control device 120 to perform the second measurement. The processing control unit 121 instructs the movement control unit 122 to move the header 108 (the center of the camera 103) to the second measurement target point based on the coordinate position of the second measurement target point in the blade groove coordinate system and on the relative positional relationship between the XY stage coordinate system and the blade groove coordinate system computed earlier. The movement control unit 122 moves the camera 103 to a position where the center of the camera 103 is aligned with the second measurement target point according to this instruction. After that, the hardness at the second measurement point is measured by the same procedure as that at the first measurement point. In other words, the worker confirms the image obtained by capturing the second measurement target point, and when there is no problem, the worker gives an instruction for the measurement. Then, the movement control unit 122 moves the hardness meter 104 to the position of the camera 103, and the sensor control unit 123 measures the hardness at the second measurement point using the hardness meter 104. The movement control unit 122 moves the camera 103 to the position of the second measurement target point again, and the sensor control unit 123 causes the camera 103 to capture an indentation image. The data acquisition unit 124 acquires the hardness measurement result and the indentation image and records the acquired measurement result and the indentation image in the storage unit 125. The storage unit 125 records the coordinate position of the second measurement point, the measured hardness data, and the indentation image. The same applies to the third and subsequent measurement points. The processing control unit 121 gives instructions to the movement control unit 122 and to the sensor control unit 123 until the hardness measurement at the final measurement point is completed, and sequentially executes movement to each measurement point, hardness measurement, and indentation image capturing.

Figure 10:
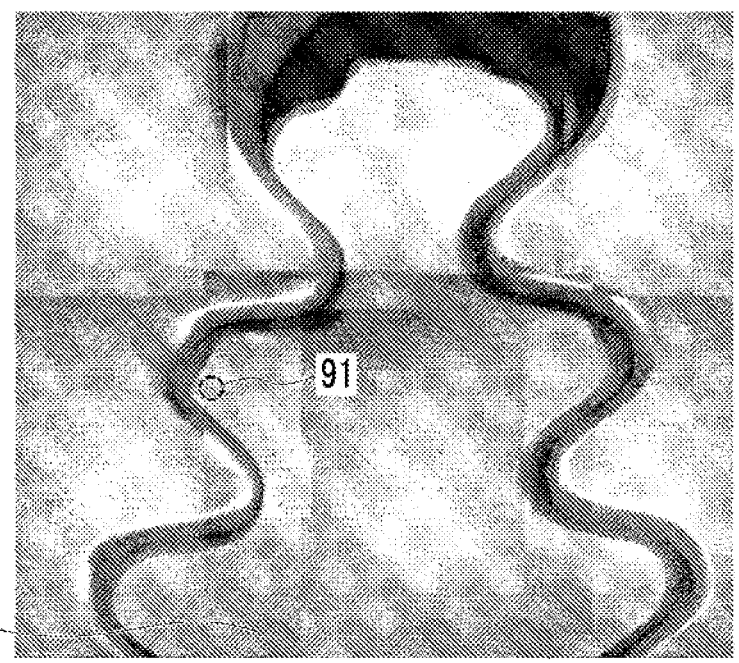
FIG. 10 is a diagram showing an example of a blade groove image after the hardness measurement process according to the embodiment of the present disclosure.
Figure 12:
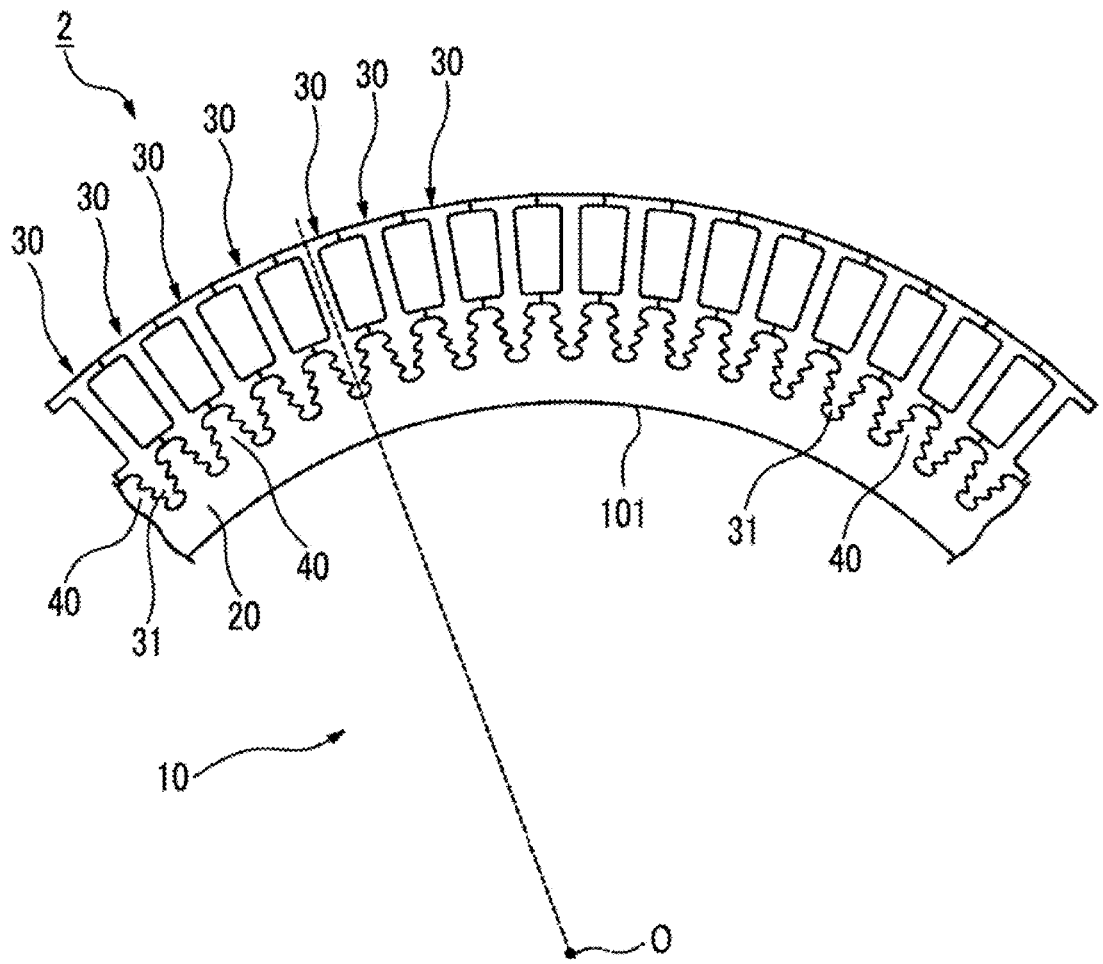
FIG. 12 is a schematic view of a front surface of the rotor of the steam turbine.

When the hardness measurement and the indentation image capturing are completed at all the measurement target points, the processing control unit 121 completes the hardness measurement process for the current blade groove 40. The image processing unit 127 may, for example, combine an indentation image with the entire image to generate an entire image of the blade groove 40 after the measurement process is completed. FIG. 10 shows an example of the entire image after the hardness measurement process is completed. For example, the mark in a frame 91 is an indentation generated by the actual hardness measurement. The image processing unit 127 may generate an image in which a mark indicating a measurement target point defined by CAD data is further superimposed on the actual indentation. In this case, as the distance from the center of the image increases due to the aberration of the camera, the indentation and the mark indicating the measurement point tend to be separated, but in order to prevent this, the image processing unit 127 may correct the aberration of the generated image.

When continuously measuring the other blade grooves 40, the worker moves the measuring device 110 to the next blade groove 40 to be measured, and executes the process after step S4.

As described above, according to the present embodiment, by inserting and attaching the measuring device 110 between the blade rows 3 and the blade row 3, the hardness of the blade groove 40 can be measured without removing the blade rows 3 from the rotor 2 of the steam turbine 1. In the hardness measurement of the blade groove 40, it is necessary to measure the hardness of one blade groove 40 at several tens of measurement points. According to the measuring system 100 of the present embodiment, the hardness can be measured with high accuracy at several tens of measurement points semi-automatically by simply attaching the measuring device 110 according to the position of the blade groove 40 to be measured. For example, the worker can see the superimposed image in which the measurement target point is displayed in the blade groove 40 before the hardness measurement, and can confirm whether or not the position of the measurement point is appropriate as a whole (step S8). When the position of the measurement point is not appropriate, the worker can set the measurement target point at the correct position on the superimposed image (step S9). The worker can make a final confirmation as to whether or not the current measurement target point is appropriate at the time of positioning immediately before the actual measurement (step S10). Accordingly, highly accurate hardness measurement is possible. Other than this confirmation work, the hardness measurement work can be automated, and hardness measurement can be performed at high speed even in places where manual work is difficult. In other words, within a limited inspection time, the tip of the hardness meter can be accurately positioned at the point to be measured in the blade groove, and the hardness distribution data can be acquired.

Figure 13:
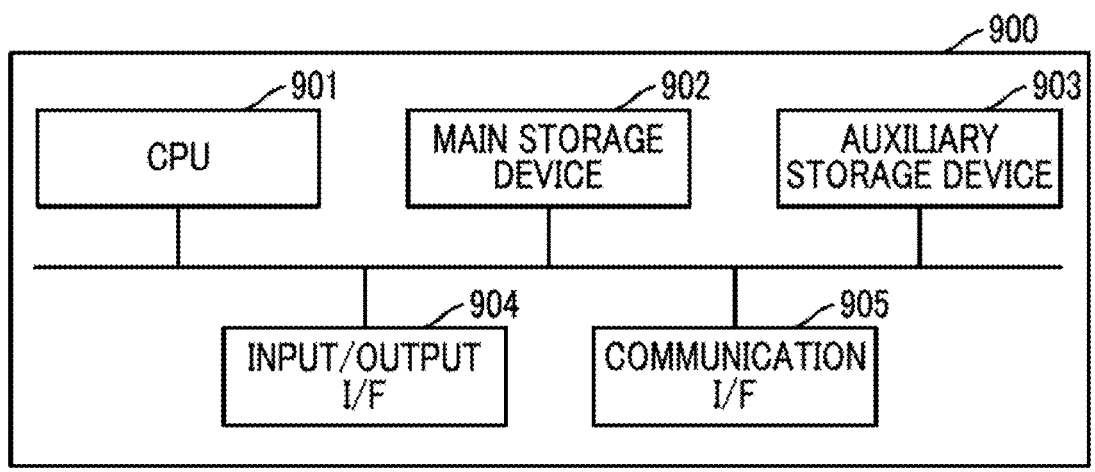
FIG. 13 is a view showing an example of a hardware configuration of a control device according to the embodiment of the present disclosure.

FIG. 13 is a view showing an example of a hardware configuration of a control device according to the embodiment of the present disclosure.

A computer 900 includes a CPU 901, a main storage device 902, an auxiliary storage device 903, an input/output interface 904, and a communication interface 905.

The control device 120 described above is mounted on the computer 900. Each of the above-described functions is stored in the auxiliary storage device 903 in the form of a program. The CPU 901 reads a program from the auxiliary storage device 903, expands the read program to the main storage device 902, and executes the above process according to the program. The CPU 901 ensures a storage area in the main storage device 902 according to the program. The CPU 901 ensures a storage area for storing the data being processed in the auxiliary storage device 903 according to the program.

By recording a program for realizing all or some of the functions of the control device 120 on a computer-readable recording medium, and by reading the program recorded on the recording medium into a computer system and executing the read program, the processes by each functional unit may be performed. The term "computer system" as used herein includes hardware such as an OS and peripheral devices. The "computer system" includes a homepage providing environment (or display environment) when a WWW system is used. The "computer-readable recording medium" refers to a portable medium such as a CD, a DVD, or a USB, or to a storage device such as a hard disk built in a computer system. When this program is distributed to the computer 900 by a communication line, the receiving computer 900 may expand the program to the main storage device 902 and execute the above process. The above program may be for realizing some of the above-described functions, and may be for further realizing the above-described functions in combination with a program already recorded in the computer system. The control device 120 may be composed of a plurality of computers 900. The storage unit 125 may be stored in an external storage device separate from the computer 900.

In addition, it is possible to replace the components in the above-described embodiment with well-known components as appropriate without departing from the gist of the present invention. The technical scope of the present invention is not limited to the above-described embodiment, and various modifications can be added without departing from the gist of the present invention.

For example, in the above-described embodiment, the hardness of the blade groove 40 in the rotor 2 of the steam turbine 1 is measured by using the measuring system 100, but the measuring system 100 can be used for measuring the hardness of other machines and equipment.

<Additional Notes>

The measuring device 110, the measuring system 100, the measuring method, and the program described in each embodiment are understood as follows, for example.

(1) The measuring device 110 according to a first aspect includes: the hardness meter 104 for measuring hardness; the actuator 104a that presses the hardness meter against an object to be measured; the camera 103 for capturing an image of a measurement range in the object to be measured; the movement mechanism (actuators 101 and 102) for moving the hardness meter 104 and the camera 103 to a desired position within the measurement range; and the fixing members 107a to 107d for fixing the movement mechanism to the object to be measured.

(2) The measuring system 100 according to a second aspect includes: the measuring device 110 of (1); and the control device 120 of the measuring device 110, and the control device 120 includes the movement control unit 122 that controls the movement mechanism, the image processing unit 127 that generates a superimposed image showing a position of a target measurement point (measurement target point) superimposed on an image of the measurement range captured by the camera, and the display control unit 126 that outputs the superimposed image.

Accordingly, it is possible to confirm the position of the entire measurement point before measurement.

(3) The measuring system 100 according to a third aspect is the measuring system 100 of (2), and further includes: a calibration unit (the processing control unit 121 computes the relative positional relationship between the coordinate system of the XY stage and the blade groove coordinate system, and based on the relative positional relationship, the processing control unit 121 instructs the movement control unit 122 to move the header 108 to the next measurement point) that converts first coordinate information indicating the position of the measurement point in a first coordinate system set for the superimposed image, into second coordinate information in a second coordinate system set for a range in which the movement mechanism moves, and the movement control unit 122 moves the hardness meter 104 to a position indicated by the second coordinate information.

As a result, the hardness meter can be automatically moved to the measurement point.

(4) The measuring system 100 according to a fourth aspect is the measuring system 100 of (3), and the movement control unit 122 moves the camera 103 to the position indicated by the second coordinate information, the image processing unit 127 generates a superimposed image showing the position of the measurement point superimposed on the image captured by the camera at the position indicated by the second coordinate information, and the display control unit 126 outputs the superimposed image.

Accordingly, from now on, it is possible to make a final confirmation of the measurement point to be measured.

(5) The measuring system 100 according to a fifth aspect is the measuring system 100 of (2) to (4), and further includes: the reception unit 128 that receives a movement instruction of the measurement point superimposed and displayed on the superimposed image, and the image processing unit 127 generates the superimposed image in which the position of the measurement point is changed, based on the movement instruction received by the reception unit 128.

As a result, from now on, the measurement points can be corrected.

(6) The measuring system 100 according to a sixth aspect is the measuring system 100 of (3) to (5), and further includes: the data acquisition unit 124 that acquires an image captured by the camera 103 and a measurement result of the hardness meter 104, and the camera 103 captures an image of an indentation generated by pressing the hardness meter 104 against the object to be measured at the position indicated by the second coordinate information, and the data acquisition unit 124 acquires the measurement result by the hardness meter 104 and the image obtained by capturing the indentation.

As a result, from now on, it is possible to acquire an image in which the indentation after the measurement is shown as evidence of the measurement together with the measurement result by the hardness meter at the measurement point.

(7) The measuring system 100 according to a seventh aspect is the measuring system 100 of (2) to (6), and the object to be measured is a blade groove of a rotor of a steam turbine.

(8) The measuring system 100 according to an eighth aspect is the measuring system 100 of (2) to (7), and the measuring device can be fixed to any blade by the fixing member in a state where the blade is attached to a rotor of a steam turbine.

(9) A measuring method according to a ninth aspect is a measuring method by the measuring device 110 of (1), and includes: a step of generating a superimposed image showing a position of a target measurement point (measurement target point) superimposed on an image of the measurement range captured by the camera 103; a step of displaying the superimposed image; a step of converting first coordinate information indicating the position of the measurement point in a first coordinate system set for the superimposed image, into second coordinate information in a second coordinate system set for a range in which the movement mechanism moves; a step of acquiring a confirmation result for the superimposed image; a step of moving the hardness meter to the position indicated by the second coordinate information when the confirmation result does not include the movement of the measurement point; and a step of performing measurement with the hardness meter 104.

(10) The measuring method according to a tenth aspect is the measuring method of (9), and further includes: a step of changing the position of the measurement point in the superimposed image when the confirmation result includes the movement of the measurement point; and a step of displaying the superimposed image after the change.

(11) A program according to an eleventh aspect causes a computer that controls the measuring device 110 of (1) to execute a step of generating a superimposed image showing a position of a target measurement point (measurement target point) superimposed on an image of the measurement range captured by the camera 103, a step of displaying the superimposed image, a step of converting first coordinate information indicating the position of the measurement point in a first coordinate system set for the superimposed image, into second coordinate information in a second coordinate system set for a range in which the movement mechanism moves, a step of acquiring a confirmation result for the superimposed image, a step of moving the hardness meter to the position indicated by the second coordinate information when the confirmation result does not include the movement of the measurement point, and a step of performing measurement with the hardness meter.

INDUSTRIAL APPLICABILITY

According to the above-described measuring device, measuring system, measuring method, and program, the hardness of the blade groove can be measured with the blade mounted on the rotor.

REFERENCE SIGNS LIST

1 Steam turbine
2 Rotor
3, 3a, 3b, 3c, 3d Blade row
10 Rotor body
20 Disk
30 Rotor blade
31 Blade root
40 Blade groove
100 Measuring system
110 Measuring device
101 Actuator
102 Actuator
103 Camera
104 Hardness meter
104a Actuator (air cylinder)
105 Laser range finder
106a, 106b, 106c, 106d Frame member
107a, 107b, 107c, 107d Fixing member
108 Header
120 Control device
121 Processing control unit
122 Movement control unit
123 Sensor control unit
124 Data acquisition unit
125 Storage unit
126 Display control unit
127 Image processing unit
128 Reception unit
900 Computer
901 CPU
902 Main storage device
903 Auxiliary storage device
904 Input/output interface
905 Communication interface

The invention claimed is:

1. A measuring device comprising:
a hardness meter for measuring hardness;
an actuator that presses the hardness meter against an object to be measured;
a range finder that measures a distance corresponding to a distance between the hardness meter and the object to be measured;
a camera for capturing an image of a measurement range in the object to be measured;
a movement mechanism including a header to which the hardness meter, the range finder, and the camera are fixed, wherein the movement mechanism is configured to move the header to a desired position within the measurement range;
a fixing member for fixing the movement mechanism to the object to be measured; and
a height adjustment mechanism that adjusts the distance between the hardness meter and the object to be measured when the movement mechanism is fixed to the object to be measured by the fixing member.

2. A measuring system comprising:
the measuring device according to claim 1; and
a control device of the measuring device, wherein
the control device includes
a movement control unit that controls the movement mechanism,
processing control unit that calculates, based on a difference of the distances measured at two positions by moving the range finder by the movement mechanism and a distance between the two positions, angle between the object to be measured and a line formed of a trajectory of movement of the range finder with respect to a direction obtained by connecting the two positions,
an image processing unit that generates a superimposed image showing a position of a target measurement point superimposed on an image of the measurement range captured by the camera, and
a display control unit that outputs the superimposed image and the angle calculated by the processing control unit.

3. The measuring system according to claim 2, further comprising:
a calibration unit that converts first coordinate information indicating the position of the measurement point in a first coordinate system set for the superimposed image, into second coordinate information in a second coordinate system set for a range in which the movement mechanism moves, wherein
the movement control unit moves the hardness meter to a position indicated by the second coordinate information.

4. The measuring system according to claim 3, further comprising:
a data acquisition unit that acquires an image captured by the camera and a measurement result of the hardness meter, wherein
the camera captures an image of an indentation generated by pressing the hardness meter against the object to be measured at the position indicated by the second coordinate information, and
the data acquisition unit acquires the measurement result by the hardness meter and the image obtained by capturing the indentation.

5. The measuring system according to claim 3, wherein
the movement control unit moves the camera to the position indicated by the second coordinate information,
the image processing unit generates a superimposed image showing the position of the measurement point superimposed on the image captured by the camera at the position indicated by the second coordinate information, and
the display control unit outputs the superimposed image.

6. The measuring system according to claim 2, further comprising:
a reception unit that receives a movement instruction for the measurement point superimposed and displayed on the superimposed image, wherein
the image processing unit generates the superimposed image in which the position of the measurement point is changed, based on the movement instruction received by the reception unit.

7. The measuring system according to claim 2, wherein
the object to be measured is a blade groove of a rotor of a steam turbine.

8. The measuring system according to claim 2, wherein
the measuring device is configured to be fixed to any blade by the fixing member in a state where the blade is attached to a rotor of a steam turbine.

9. A measuring method by the measuring device according to claim 1, the method comprising:
- a step of calculating, based on a difference of the distances measured at two positions by moving the range finder by the movement mechanism and a distance between the two positions, angle between the object to be measured and a line formed of a trajectory of movement of the range finder with respect to a direction obtained by connecting the two positions,
- a step of displaying the angle,
- a step of adjusting the height adjustment mechanism based on the angle,
- a step of generating a superimposed image showing a position of a target measurement point superimposed on an image of the measurement range captured by the camera;
- a step of displaying the superimposed image;
- a step of converting first coordinate information indicating the position of the measurement point in a first coordinate system set for the superimposed image, into second coordinate information in a second coordinate system set for a range in which the movement mechanism moves;
- a step of acquiring a confirmation result for the superimposed image;
- a step of moving the hardness meter to the position indicated by the second coordinate information when the confirmation result does not include the movement of the measurement point; and
- a step of performing measurement with the hardness meter.

10. The measuring method according to claim 9, further comprising:
- a step of changing the position of the measurement point in the superimposed image when the confirmation result includes the movement of the measurement point; and
- a step of displaying the superimposed image after the change.

11. A non-transitory computer readable storage medium storing a program for causing a computer that controls the measuring device according to claim 1 to execute
- a step of calculating, based on a difference of the distances measured at two positions by moving the range finder by the movement mechanism and a distance between the two positions, angle between the object to be measured and a line formed of a trajectory of movement of the range finder with respect to a direction obtained by connecting the two positions,
- a step of displaying the angle,
- a step of adjusting the height adjustment mechanism based on the angle,
- a step of generating a superimposed image showing a position of a target measurement point superimposed on an image of the measurement range captured by the camera,
- a step of displaying the superimposed image,
- a step of converting first coordinate information indicating the position of the measurement point in a first coordinate system set for the superimposed image, into second coordinate information in a second coordinate system set for a range in which the movement mechanism moves,
- a step of acquiring a confirmation result for the superimposed image,
- a step of moving the hardness meter to the position indicated by the second coordinate information when the confirmation result does not include the movement of the measurement point, and
- a step of performing measurement with the hardness meter.

12. A measuring method by a measuring device comprising a hardness meter for measuring hardness; an actuator that presses the hardness meter against an object to be measured; a camera for capturing an image of a measurement range in the object to be measured; a movement mechanism for moving the hardness meter and the camera to a desired position within the measurement range; and a fixing member for fixing the movement mechanism to the object to be measured, the method comprising:
- a step of generating a superimposed image showing a position of a target measurement point superimposed on an image of the measurement range captured by the camera;
- a step of displaying the superimposed image;
- a step of converting first coordinate information indicating the position of the measurement point in a first coordinate system set for the superimposed image, into second coordinate information in a second coordinate system set for a range in which the movement mechanism moves;
- a step of acquiring a confirmation result for the superimposed image;
- a step of moving the hardness meter to the position indicated by the second coordinate information when the confirmation result does not include the movement of the measurement point; and
- a step of performing measurement with the hardness meter.

13. A non-transitory computer readable storage medium storing a program for causing a computer that controls a measuring device comprising a hardness meter for measuring hardness; an actuator that presses the hardness meter against an object to be measured; a camera for capturing an image of a measurement range in the object to be measured; a movement mechanism for moving the hardness meter and the camera to a desired position within the measurement range; and a fixing member for fixing the movement mechanism to the object to be measured, to execute
- a step of generating a superimposed image showing a position of a target measurement point superimposed on an image of the measurement range captured by the camera,
- a step of displaying the superimposed image,
- a step of converting first coordinate information indicating the position of the measurement point in a first coordinate system set for the superimposed image, into second coordinate information in a second coordinate system set for a range in which the movement mechanism moves,
- a step of acquiring a confirmation result for the superimposed image,
- a step of moving the hardness meter to the position indicated by the second coordinate information when the confirmation result does not include the movement of the measurement point, and
- a step of performing measurement with the hardness meter.

* * * * *